US007836434B1

(12) United States Patent
Boucher

(10) Patent No.: US 7,836,434 B1
(45) Date of Patent: Nov. 16, 2010

(54) METHOD AND SYSTEM FOR ANALYZING ARRAY ACCESS TO A POINTER THAT IS REFERENCED AS AN ARRAY

(75) Inventor: Michael L. Boucher, Lafayette, CO (US)

(73) Assignee: Oracle America, Inc., Redwood City, CA (US)

( * ) Notice: Subject to any disclaimer, the term of this patent is extended or adjusted under 35 U.S.C. 154(b) by 1348 days.

(21) Appl. No.: 10/837,602

(22) Filed: May 4, 2004

(51) Int. Cl.
*G06F 9/44* (2006.01)

(52) U.S. Cl. .................. 717/127; 717/150; 717/139; 717/146; 717/148

(58) Field of Classification Search ......... 717/150–153, 717/130, 146, 148, 118, 139; 711/2, 111, 711/118–119, 123, 137, 120, 202; 716/17–19, 716/3, 5, 6
See application file for complete search history.

(56) References Cited

U.S. PATENT DOCUMENTS

| 5,175,856 | A | * | 12/1992 | Van Dyke et al. | 717/151 |
|---|---|---|---|---|---|
| 5,481,708 | A | * | 1/1996 | Kukol | 717/155 |
| 5,535,391 | A | * | 7/1996 | Hejlsberg et al. | 717/140 |
| 5,586,325 | A | * | 12/1996 | MacDonald et al. | 717/153 |
| 5,603,030 | A | * | 2/1997 | Gray et al. | 717/151 |
| 6,014,723 | A | * | 1/2000 | Tremblay et al. | 711/1 |
| 6,078,745 | A | * | 6/2000 | De Greef et al. | 717/151 |
| 6,154,877 | A | * | 11/2000 | Ramkumar et al. | 717/114 |
| 6,161,219 | A | * | 12/2000 | Ramkumar et al. | 717/130 |
| 6,343,375 | B1 | * | 1/2002 | Gupta et al. | 717/152 |
| 6,457,023 | B1 | * | 9/2002 | Pinter et al. | 707/206 |
| 6,467,075 | B1 | * | 10/2002 | Sato et al. | 716/18 |
| 6,507,947 | B1 | * | 1/2003 | Schreiber et al. | 717/160 |
| 6,971,091 | B1 | * | 11/2005 | Arnold et al. | 717/145 |
| 7,010,783 | B2 | * | 3/2006 | de Jong | 717/131 |
| 7,058,929 | B2 | * | 6/2006 | Charnell et al. | 717/135 |
| 7,062,761 | B2 | * | 6/2006 | Slavin et al. | 717/151 |
| 7,114,034 | B2 | * | 9/2006 | Hu et al. | 711/119 |
| 7,127,559 | B2 | * | 10/2006 | Hu et al. | 711/118 |

OTHER PUBLICATIONS

Optimization of Array Subscript Range Checks, J. M. Asuru, ACM, vol. 1, No. 2, Jun. 1992, pp. 109-118.*

(Continued)

*Primary Examiner*—Lewis A Bullock, Jr.
*Assistant Examiner*—Michael Yaary
(74) *Attorney, Agent, or Firm*—Marsh Fischmann & Breyfogle LLP; Jonathon A. Szumny; Kent A. Lembke

(57) ABSTRACT

Methods, systems, and articles of manufacture consistent with the present invention provide an improved technique for analyzing statements that use pointer or array syntax to access dynamically-allocated arrays to determine whether the statement generates a reference that is outside the bounds of the array's allocated memory. Statements that use pointer or array syntax to access dynamically-allocated arrays can be either statically (at compile-time) or dynamically bounds (at run-time) checked. Methods and systems in accordance with the present invention determine at compile-time if an array reference can be determined to always be in bounds or definitely out of bounds at least once, and if not, insert code into the program to check the array bounds dynamically at run-time before the access of the array reference.

34 Claims, 5 Drawing Sheets

OTHER PUBLICATIONS

A Reexamination of Optimization of Array Subscript Range Checks, Wei-Ngan Chin et al, 1995, ACM, pp. 217-227.*

Borland, C++ 3.0, 1991, p. 161.*

Austin et al; "Efficient Detection of All Pointer and Array Access Errors;" Computer Science Department, University of Wisconson-madison; pp. 298-301.*

* cited by examiner

METHOD AND SYSTEM FOR ANALYZING ARRAY ACCESS TO A POINTER THAT IS REFERENCED AS AN ARRAY

BACKGROUND

1. Field of the Invention

The present invention generally relates to data processing systems. In particular, methods and systems in accordance with the present invention generally relate to the checking of array bounds in a programming environment such as C or C++.

2. Background

Computers are increasingly important in today's society, and software used to control these computers is typically written in a programming language. C, C++ and other similar variations are examples of widely used programming languages. The programming language C is described, for example, in detail in Al Kelley et al., "A Book on C," Addison-Wesley, 1997, which is incorporated herein by reference. In developing software, typically a software developer writes code, referred to as "source code," in a programming language, and the source code is compiled by a compiler into "object code" that can be run by a machine.

A common source of programming errors in many programming languages arises from accessing memory outside of a valid range. A common programming error in accessing memory outside of a valid range involves over-indexing or under-indexing an array, i.e., attempting to access an array outside of its range. An array is a data structure that is commonly allocated in memory in programming environments such as C or C++. An array is a collection of typically identically-typed data items distinguished by their indices. Each item in an array is called an "array element." For example, there may be an array of integers, characters or anything that has defined data type. Typical exemplary characteristics of an array may include (but are not required to include): (1) each element having the same data type (although they may have different values), and (2) the array being stored contiguously in memory. Arrays are generally appropriate for storing data to be accessed in an unpredictable order, in contrast to lists which are best when accessed sequentially.

Additionally, arrays may have more than one dimension. The number of dimensions an array can have depends on the programming language. A one-dimensional array is called a "vector;" a two-dimensional array is called a "matrix." A single ordinary variable (a "scalar") could be considered as a zero-dimensional array. A reference to an array element may typically be written in the form A[i][j][k] where A is the array name and i, j and k are the indices.

The problem of accessing memory outside of a valid array range may apply to many programming languages which enable a user to dynamically allocate memory for arrays during run-time such that dynamic (nm-time) or static (compile-time) error checking is difficult, as the dynamic allocation is separated from the semantics of use. After the memory space for an array has been allocated to the array, it may be difficult to determine whether an access or reference to an element of the array is within the valid memory range allocated to the array, especially when the array is allocated dynamically at run-time. Dynamic allocation is allocation at run-time and may not necessarily be determined before the running of the program, such as when the allocation for the array is based on a variable determined during the running of the program.

As an example, in conventional compilers, consider a static array definition and reference in C or C++:

int x, array1[100];
...
x=array1[50];

Upon recognizing the definition of array1, the compiler generates code to establish storage for 100 elements having an appropriate size for integer elements, storing in a table information regarding the array name, starting address, type and size of each element, the number of elements, and the allowed range of index values for accessing elements of array1. Upon recognizing the reference to "array1[50]," the compiler typically calculates an address for the referenced element by first calculating an offset value from the initial storage address for the array, and then adding the offset value to the starting address. For this example, the reference to "array1[50]" is within the bounds of array 1 as defined, and thus should result in an appropriate access to the desired array element.

For the example discussed above, consider a reference:

x=array1[200];

Since the possible index values for array1 range from 0 to 99, i.e., elements, an index value of 200 is outside the bounds of array1 as defined, and if code for this reference is generated and executed, the information stored at the address so generated may lead to undesirable results.

Conventional approaches to array bounds checking include catching invalid memory references but typically not references to the memory space for that particular array. One class of programs that catch invalid memory references are referred to as "malloc" debuggers, which catch bugs related to memory allocated on the heap through the function "malloc( )" An exemplary malloc debugger is "Electric Fence" by Bruce Perens, and more information on Electric Fence is currently available at the URL http://perens.com/FreeSoftware.

Electric Fence replaces the default implementation of malloc with a version that allocates data in a way that helps catch overrun or underrun errors in a program. Electric Fence works by aligning allocated memory so that it is immediately followed by unmapped memory. Unmapped memory is ordinary memory to which the operating system has been instructed to deny all access. When a program reads or writes unmapped memory, the operating system sends a signal to the program that typically results in the program being terminated.

Another conventional approach that overcomes some of the previously mentioned problems is binary instrumentation. In this approach, the executable program is modified so that loads and stores are replaced with instructions that cause a "trap" also known as an "interrupt." A trap or interrupt may be a signal informing a system that an event has occurred. When a system receives an interrupt signal, it may take a specified action (which can be to ignore the signal). Interrupt signals can cause a program to suspend itself temporarily to service the interrupt. In the course of processing the trap or interrupt, the system figures out the address that the load or store would have used, validates that it is legal, and then emulates it if it would be legal. Two exemplary products that take this approach are "Purify" from Rational and "RTC" from Sun Microsystems, Inc. See also, Sun Microsystems, "Debugging a Program With dbx," March 2004, Rev A, part number 817-5063-10. Furthermore, the CHECK command activates the RTC feature in Sun Microsystems' debugger.

This approach is typically superior to the malloc debuggers in several respects. First, it can perform protection on arbitrary granularity. Second, it can validate any memory reference and not just those referring to addresses on the heap. However, it does not associate memory references with the program element that originated the reference and so it is still susceptible to the type of memory overrun that happens to hit a valid block of memory. For example, in the following situation:

REAL x(10), y(10)
a=x(11)

The reference to x(11) is out of bounds for x, but hits a legal memory address (the address for y(1) because y immediately follows x in memory). Because binary instrumentation does not associate memory references with the program elements that generated them, it does not detect that the reference to x(11) is illegal. If it associated memory references with the program element that generated them, then it would associate the reference to x(11) with x and notice that the memory reference is out of bounds for x. However, as it is, the reference to x(11) hits a legal place in memory so the overrun is not detected.

Some programming languages permit pointers to serve both as pointers and arrays, sometimes called "overloading" the pointer. In these languages, pointers may be referenced in code as an array using array syntax. For example, a pointer ab may be referenced as a pointer *ab or an array ab[j]. Other languages do not permit pointers to be accessed or referenced as an array in such a manner. In these languages, arrays are treated as arrays, and pointers are treated as pointers, and each are accessed and referenced as such accordingly. In these languages, array syntax is not used to access a pointer. Programming environments that permit pointers to serve as pointers and arrays may create additional difficulties related to array bounds checking.

Therefore, a need has long existed for a method and system that overcome the problems noted above and others previously experienced.

SUMMARY

Methods and systems consistent with the present invention analyze statements that use pointer or array syntax to access dynamically-allocated arrays to determine whether the statement generates a reference that is outside the bounds of the array's allocated memory.

In one implementation, a method is provided in a data processing system having a pointer referenced as an array, comprising the steps of determining during compile time whether an array access to the pointer is always in bounds of an array, and determining during compile time whether at least one array access to the pointer is always out of bounds of the array. The method further comprises the step of inserting code to check the array access during run-time based on the determinations.

In another implementation, a computer-readable medium is provided containing instructions for controlling a data processing system having a pointer referenced as an array, to perform a method. The method comprises the steps of determining during compile time whether an array access to the pointer is always in bounds of the array, and determining during compile time whether at least one array access to the pointer is always out of bounds of the array. The method further comprises the step of inserting code to check the array access during run-time based on the determinations.

In yet another implementation, a data processing system is provided having a pointer referenced as an array, and comprises a memory having a program that determines during compile time whether an array access to the pointer is always in bounds of an array, determines during compile time whether at least one array access to the pointer is always out of bounds of the array, and inserts code to check the array access during run-time based on the determinations. The data processing system further comprises a processor for running the program.

In one implementation, a method is provided in a data processing system having a pointer referenced as an array comprising the step of determining whether an array access to the pointer is in bounds of an array.

In another implementation, a computer-readable medium is provided containing instructions for controlling a data processing system to perform a method. The method comprises the step of determining whether an array access to the pointer is in bounds of an array.

In yet another implementation, a data processing system is provided comprising a memory having a program that determines whether an array access to the pointer is in bounds of an array. The data processing system further comprises a processor for running the program.

BRIEF DESCRIPTION OF THE DRAWINGS

The accompanying drawings, which are incorporated in and constitute a part of this specification, illustrate embodiments in accordance with methods and systems consistent with the present invention and, together with the description, serve to explain the advantages and principles consistent with the present invention.

DETAILED DESCRIPTION

Figure 1:
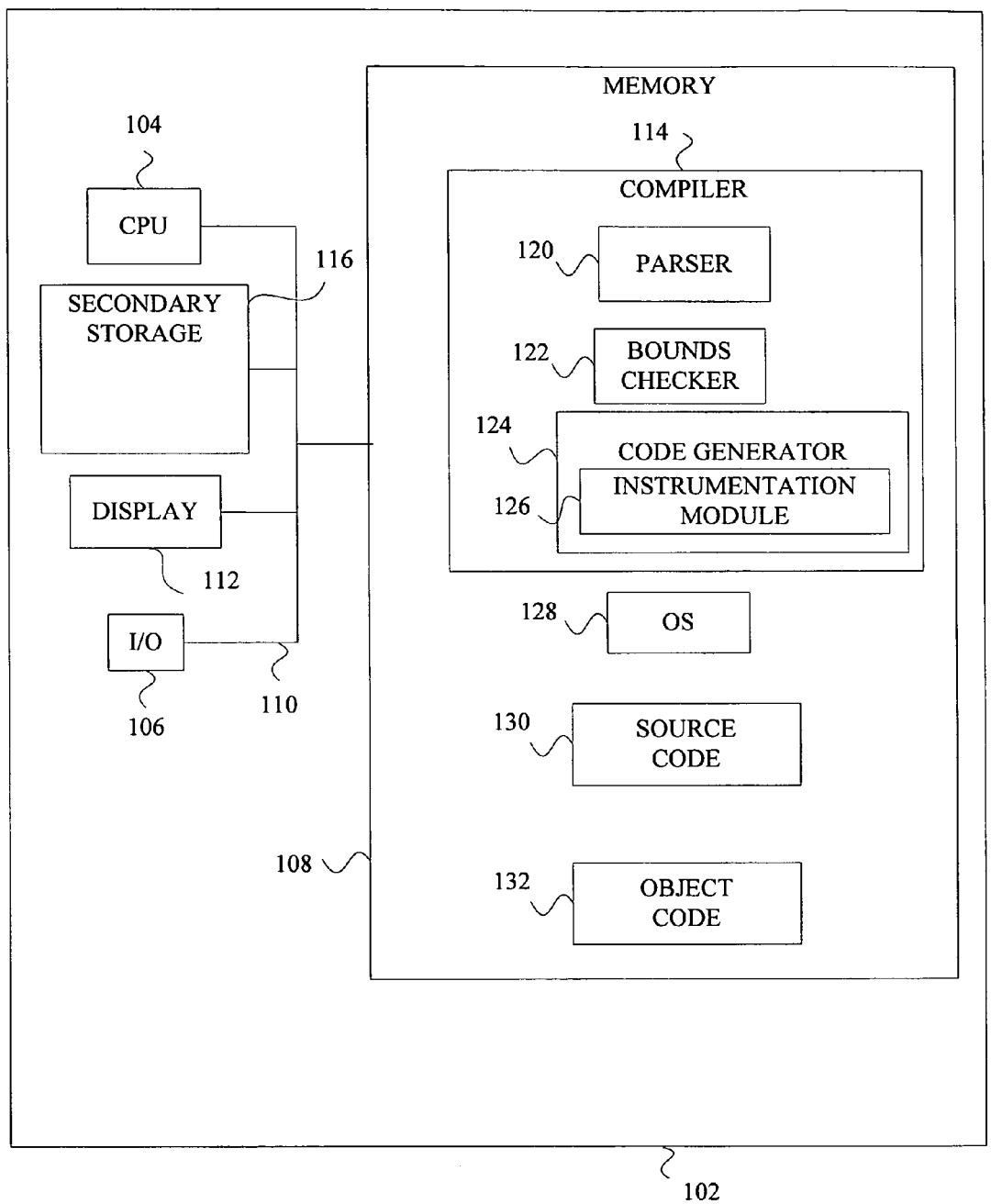
FIG. 1 depicts an exemplary data processing system suitable for use in accordance with methods and systems consistent with the present invention.

Methods and systems consistent with the present invention analyze references to arrays to determine whether the references are within the bounds of memory allocated for the referenced arrays. Methods, systems, and articles of manufacture consistent with the present invention analyze statements that use pointer or array syntax to access dynamically-allocated arrays to determine whether the statement generates a reference that is outside the bounds of the array's allocated memory. Statements that use pointer or array syntax to access dynamically-allocated arrays can be either statically (at compile-time) or dynamically (at run-time) bounds checked. Methods and systems in accordance with the present invention may particularly apply to programming languages or environments that permit pointers to serve as both pointers and arrays, and that reference pointers as arrays. Methods and systems in accordance with the present invention determine at compile-time if an array reference can be determined to always be in bounds or definitely out of bounds at least once, and if not, insert code into the program to check the array bounds dynamically at run-time before the access of the array reference.

In one implementation, the checks may be performed if the access statements accessing the collected memory are "dominated" (discussed below) by the statement that allocated the memory, and the pointer assignment in the allocation statement is guaranteed to be live in the access statements, i.e., the allocation is still applicable and valid when the access occurs. An assignment is "live" if it has not been eliminated by another assignment to the same thing. For example, in the sequence of statements "xy=1; yz=xy; xy=2; ab=xy+526," the first assignment of xy is live at the time of the second statement (yz=xy), but the assignment "xy=2" eliminates the first assignment. At the time of "ab=xy+526," the first assignment is dead and the second assignment is live. In the example below, the pointer assignment refers to the ab=assignment in the example below, which is the assignment of the malloc to the pointer (ab). For example:

float *ab;
 ab=malloc(sizeof(float)*(N+1));
 . . .
 cd=ab[index];

In this example, the code allocates space for an array ab and assigns cd a reference to the value in an element of the array. The array ab has n elements. If the assignment to cd is dominated by the allocation to ab, and if the value of that assignment is guaranteed to be live at the assignment to cd, then the access to ab can be bounds checked on 0 . . . N. If the range of "index" in the code can be determined relative to 0 and N then the check can be static, otherwise it can be dynamic. If it can be shown to be between 0 and N, then no check needs to be made. If it can be shown to be less then N, but no determination can be made relative to zero, then only the check for less-than-zero needs to be made. Similarly, if it is known to be non-negative but cannot be determined with respect to N, then only the check against N needs to be made.

Regarding live pointer assignments, consider three possible variants of this example:

float *ab;
 ab=malloc (sizeof (float)*(N+1));
 de=1;
 cd=ab[index];

and:

float *ab;
 ab=malloc (sizeof (float)*(N+1));
 ab=something_else;
 cd=ab [index];

and:

float*ab;
 ab=malloc (sizeof (float)*(N+1));
 if (some_condition) {
 ab=something_else;
 }
 cd=ab [index];

In the first variant, the "ab=malloc . . . " assignment is guaranteed to be live at the time of the "cd=ab [index]" use which means it is known that ab points to a set of N+1 floats. In the second variant, the "ab=malloc . . . " assignment is eliminated by the "ab=something_else" assignment so it is known that the first assignment is not live at the time of the "cd=ab[index]" assignment. In the third variant, the "ab=something_else" assignment will eliminate the "ab=malloc . . . " assignment, but only if it is executed. If some_condition is false, "ab=something_else" will not be executed and "ab=malloc" will not be eliminated. These examples involve whether the pointer assignment is guaranteed to be live at the access point, and if it is, the information from the pointer assignment can be used to figure out the bounds as in the case in variant one. If it is not guaranteed to be live, then it may not be known which bounds to use as in the cases in variants two and three.

Methods and systems in accordance with the present invention may comprise a compiler which determines whether a particular use of an array is dominated by a particular definition or set of definitions that all have the same bounds, and whether the use postdominates the definition or set of definitions. For example, statement A dominates statement B if and only if the only way to get to B requires executing A. In the example below, a=1 dominates b=a+3, so b can be compiled as b=1+3 if desired:

a=1; c=526; b=a+3;

In the example below, a=1 does not dominate b=a+3 so a+3 must be computed at run-time:

If (condition) {a=1;}

B=a+3;

Statement A postdominates statement B if executing statement B implies that statement A must later be executed. In both examples above, b=a+3 postdominates a=1 because every time that a=1 is executed, b=a+3 postdominates and is guaranteed to be executed. In the example discussed above previously, the compiler determines whether the use of ab in "cd=ab[index]" refers to the definition of ab at the malloc. An array may also be statically defined by a statement such as "float ab[526];" in which case the definition is known to dominate the use and the use is known to postdominate the definition.

Once the bounds for a particular use are established, methods and systems in accordance with the present invention may check the reference against the bounds. In the previous example above, if the compiler can determine that "index" is always in bounds, then no run-time check needs to be performed. If the compiler determines that index is definitely out of bounds in one or more cases, then it can issue a compile-time error message. If the compiler cannot determine that index is always in bounds or definitely out of bounds at least once, i.e., the compiler cannot be sure, then it may generate and insert code into the program that performs a run-time check before the access of the array reference. The run-time check may be against the upper and lower bounds of the array or against only one of the bounds if the compiler can determine that the index never violates one of the bounds. For the example shown above, if the compiler can determine that index is strictly non-negative then, in this case, it would have to check only the upper bound.

Methods and systems in accordance with the present invention may particularly apply to programming environments that allow pointers to be referenced as arrays.

FIG. 1 depicts an exemplary data processing system suitable for use in accordance with methods and systems consistent with the present invention. FIG. 1 shows a computer 102 which may be connected to a network, which may be wired or wireless, and may be a LAN or WAN, and the computer may represent any kind of data processing device, such as a general-purpose data processing device, a personal computer, a plurality of interconnected data processing devices, video game console, clustered server, a mobile computing device, a personal data organizer, a mobile communication device including mobile telephone or similar devices. The computer 102 may represent a computer in a distributed environment, such as on the Internet. There may also be more computers 102 than shown on the figure.

A computer 102 may include a central processing unit ("CPU") 104, an input-output ("I/O") unit 106 such as a mouse or keyboard, or a graphical input device such as a writing tablet, and a memory 108 such as a random access memory ("RAM") or other dynamic storage device for storing information and instructions to be executed by the CPU. The computer 102 also includes a secondary storage device 116 such as a magnetic disk or optical disk that may communicate with each other via a bus 100 or other communication mechanism. The computer 102 may also include a display 112 such as a cathode ray tube ("CRT") or LCD monitor, and an audio/video input (not shown) such as a webcam and/or microphone.

Although aspects of methods and systems consistent with the present invention are described as being stored in memory 108, one having skill in the art will appreciate all or part of methods and systems consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the data processing system are described, one skilled in the art will appreciate that a data processing system suitable for use with methods, systems, and articles of manufacture consistent with the present invention may contain additional or different components. The computer 102 may include a human user or may include a user agent. The term "user" may refer to a human user, software, hardware or any other entity using the system.

As shown, the memory 108 in the computer 102 may include a compiler 114, parser 120, bounds checker 122, code generator 124 and instrumentation module 126 which are described further below. Although only one compiler 114 is shown, any number of compilers 114 or other components may be used. Additionally, although shown on the computer 102 in the memory 108, these components may reside elsewhere, such as in the secondary storage 116, or on another computer, such as another computer 102. Furthermore, these components may be hardware or software whereas embodiments in accordance with the present invention are not limited to any specific combination of hardware and/or software. The system may be implemented in any way, in software or hardware or a combination thereof, and may be distributed among many computers with any number of components, processes, threads, etc.

Computers 102 may communicate directly or over networks, and may communicate via wired and/or wireless connections, including peer-to-peer wireless networks, or any other method of communication. Communication may be done through any communication protocol, including known and yet to be developed communication protocols. The network may comprise many more computers 102 than those shown on the figure, and the computers may also have additional or different components than those shown.

It will be appreciated that various modifications to detail may be made to the embodiments as described herein. It is noted that the above elements of the above examples may be at least partially realized as software and/or hardware. Further, it is noted that a computer-readable medium may be provided having a program embodied thereon, where the program is to make a computer or system of data processing devices execute functions or operations of the features and elements of the above described examples. A computer-readable medium may include storaqe medium such as a magnetic or optical or other tangible medium on which a program is embodied, but can also be transmission medium such as a signal, (e.g., analog or digital), electromagnetic or optical, in which the program is embodied for transmission. Further, a computer program product may be provided comprising the computer-readable medium.

There are several possible ways a reference to an array may be encountered in code. As an example, there may be no definition of the array in the local source code (e.g., a pointer to the array may be passed in as a parameter). In this case, if there is no other information available to determine the array definition or its defined bounds, it may be difficult to determine out-of-bounds references.

As another example, one definition may be associated with an array such that one malloc statement dominates its use (i.e., every path to a reference of the array is dominated by the malloc) such that the only way the array can be referenced is through an execution of the malloc statement. If the compiler is able to determine at compile time that all references to the array are through the single malloc statement, and if the compiler is able to statically determine whether any array reference is outside the bounds of the array, then there is no need for a run-time check, as the compiler will be able to issue an error during compilation if an array reference is out of bounds.

If an array has a static definition with defined bounds that are constants, and if references to the array are by constant index values, then the compiler will be able to determine whether array references are in bounds without requiring a run-time check.

If an array is dynamically allocated, for example, by a malloc statement, and references to the array are made inside a loop (e.g., a for loop iterating on an index value) such that the compiler is able to determine that the values of the index during execution of the loop do not go outside the defined bounds of the array, then the compiler will be able to determine whether array references are in bounds without requiring a nm-time check.

Consider the following example of a static array:
int x, y, array2[100]
for (int i=1; i<=100; i++)
array2[i]=i;

For programming languages such as C and C++, the definition of array2 establishes an integer type array having 100 elements, with allowed index values from 0 to 99. A compiler should be able to determine during compilation of this code that the index "i" will take on a value of 100 in the last iteration of the for loop, thereby creating a reference to "array2[100]" which is out of bounds for array2 as defined.

Consider an example wherein an array is dynamically allocated (e.g., via a malloc statement) and referenced depending on some condition. For example, consider the following:
int n, x, p;
int *array3;
. . . /* input values for n and x */
array3=malloc (sizeof (int)*n);
if (x>=0)
p=2;
else
t=array3 [x];

For this example, the compiler may determine that the reference to array3 is out of bounds, as the reference statement is only executed if the value of x is negative.

As another example, if an array reference is dominated by multiple malloc statements which all have the same bounds, then the compiler may determine whether the reference is valid. In yet another example, an array may be dynamically allocated (e.g., via a malloc), but the compiler is unable to determine which statement is actually executed to allocate the storage, for example:
int p, q, bluesky, greysky;
int*array4;
. . . /* input values of q, bluesky and greysky */

```
if (bluesky)
array4=malloc (sizeof (int)*200);
else if (greysky)
array4=malloc (sizeof (int)*100);
p=array4 [q];
```

For cases wherein the compiler is unable to determine whether a reference to an element of a dynamically allocated array is in bounds, the compiler inserts code to be executed at a time when the size of the malloc is known, which will generate values of the allocated array's bounds. Additionally, the compiler inserts code to check the value of the index "q" of the reference to array4 (e.g., before the assignment to "p" is executed) so that corrective measures may be taken (e.g., issue an error message) to avoid fatal errors in execution. For example, if the condition "bluesky" is true during execution of the code shown above, code inserted by the compiler immediately before the assignment to "p" may check that the value of "q" is in the range 0<=q<n to verify that the reference will be inside the bounds of the dynamically allocated area for array4.

While the examples discussed above involve one-dimensional arrays, an extension to multidimensional arrays is straightforward by similarly checking index values of references against defined bounds for each dimension, insofar as bounds for each dimension of a particular multidimensional array can be determined by a compiler.

Figure 2:
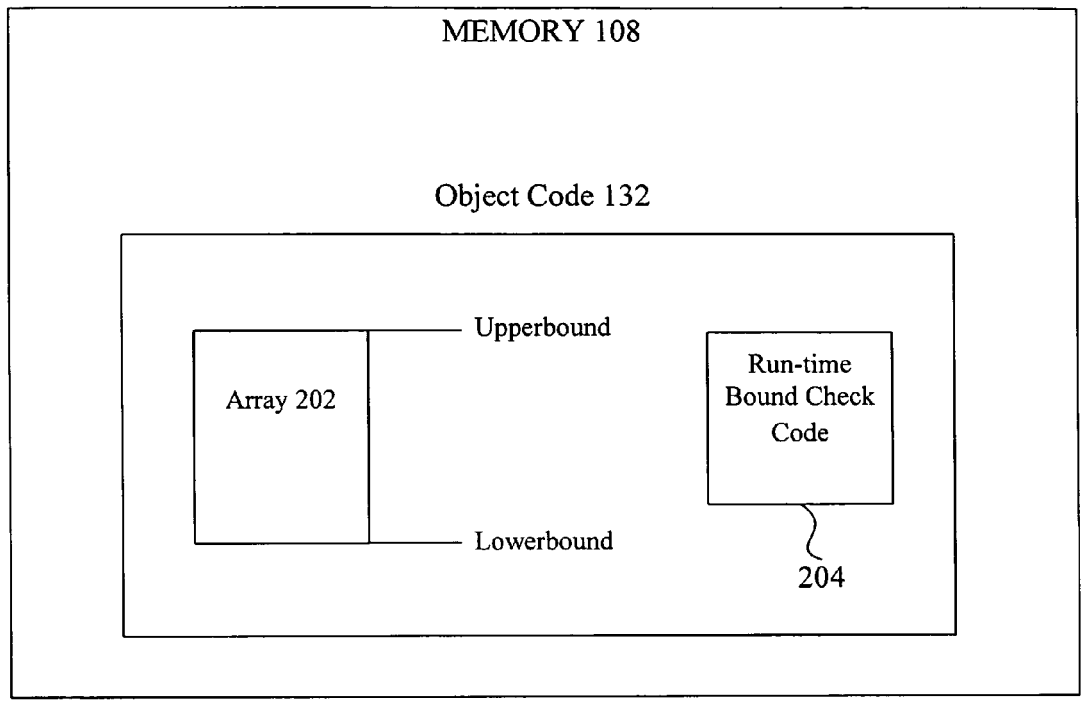
FIG. 2 depicts an array in the memory of an computer in accordance with methods and systems consistent with the present invention.

FIG. 2 depicts an array 202 in the memory 108 of a computer 102 in accordance with methods and systems consistent with the present invention. The array 202 is shown with a lower bound and upper bound and is shown to be allocated in a region of memory 108. The array 202 may comprise indexed elements (not shown) as previously discussed. On FIG. 2, the array 202 is represented in the object code 132 that may allocate the array, but the array may also be stored elsewhere. FIG. 2 also depicts run-time bound check code 204 which may be code inserted into a program to perform a run-time bound check on an array 202 prior to an array reference. As an example, consider the following code as written by a user:

```
char *ab, cd;
if (ij==1) {
ab=malloc (100);
} else {
ab=malloc (200);
}
...
cd=ab[j];
```

The compiler 114 may automatically compile this code in accordance methods and systems consistent with the present invention as follows:

```
char *ab, cd;
int ubound;
if (ij==1) {
ab=malloc(100);
ubound=100;
} else {
ab=malloc(200);
ubound=200;
}
...
if (j<ubound) {
cd=ab[j];
} else {
perror("Bounds fault");
exit(-1);
```

Figure 3A:
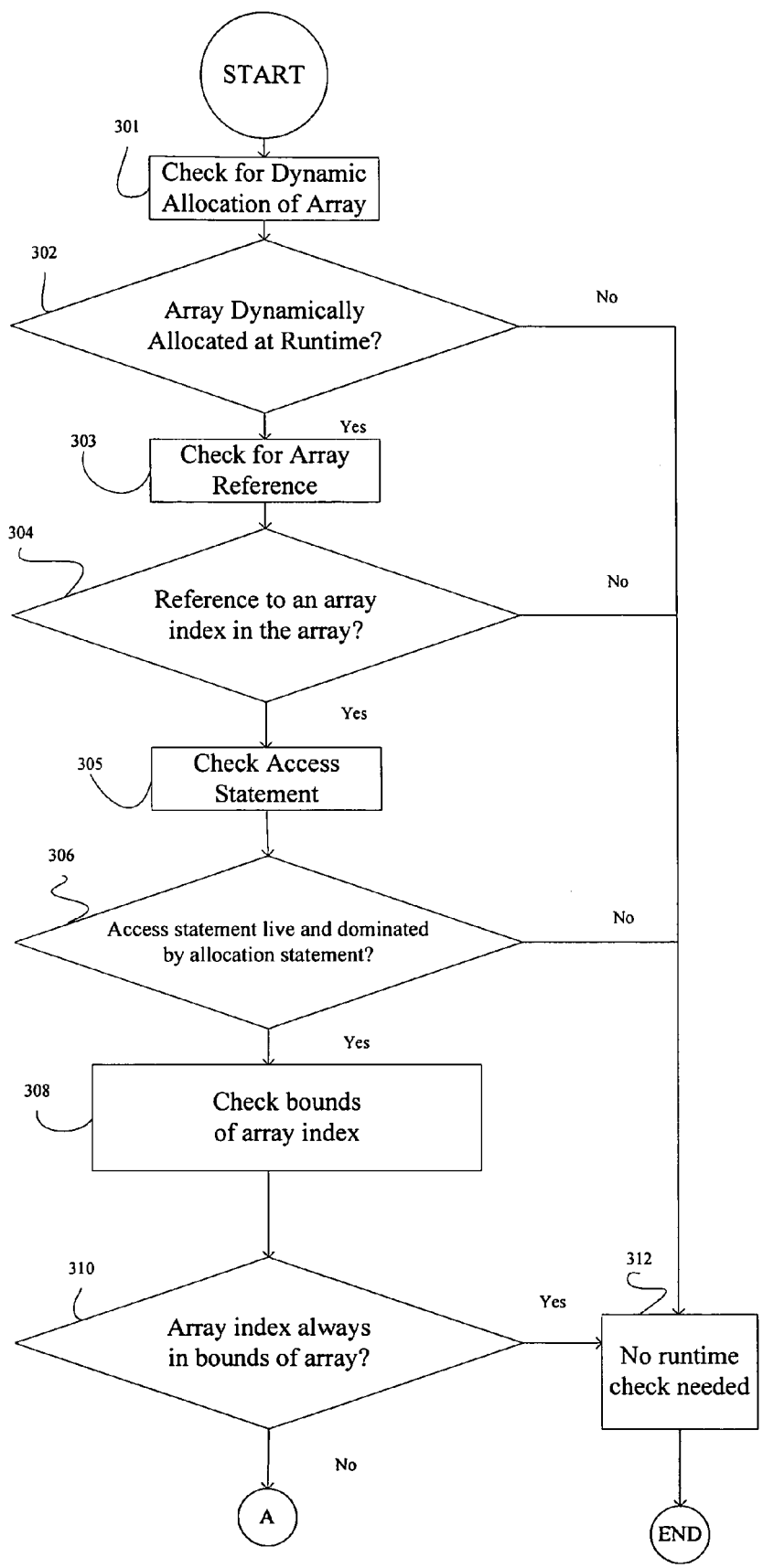
FIGS. 3a and 3b depict steps in an exemplary method for analyzing array references at compile-time and inserting run-time bounds checking code in accordance with the present invention.
Figure 3B:
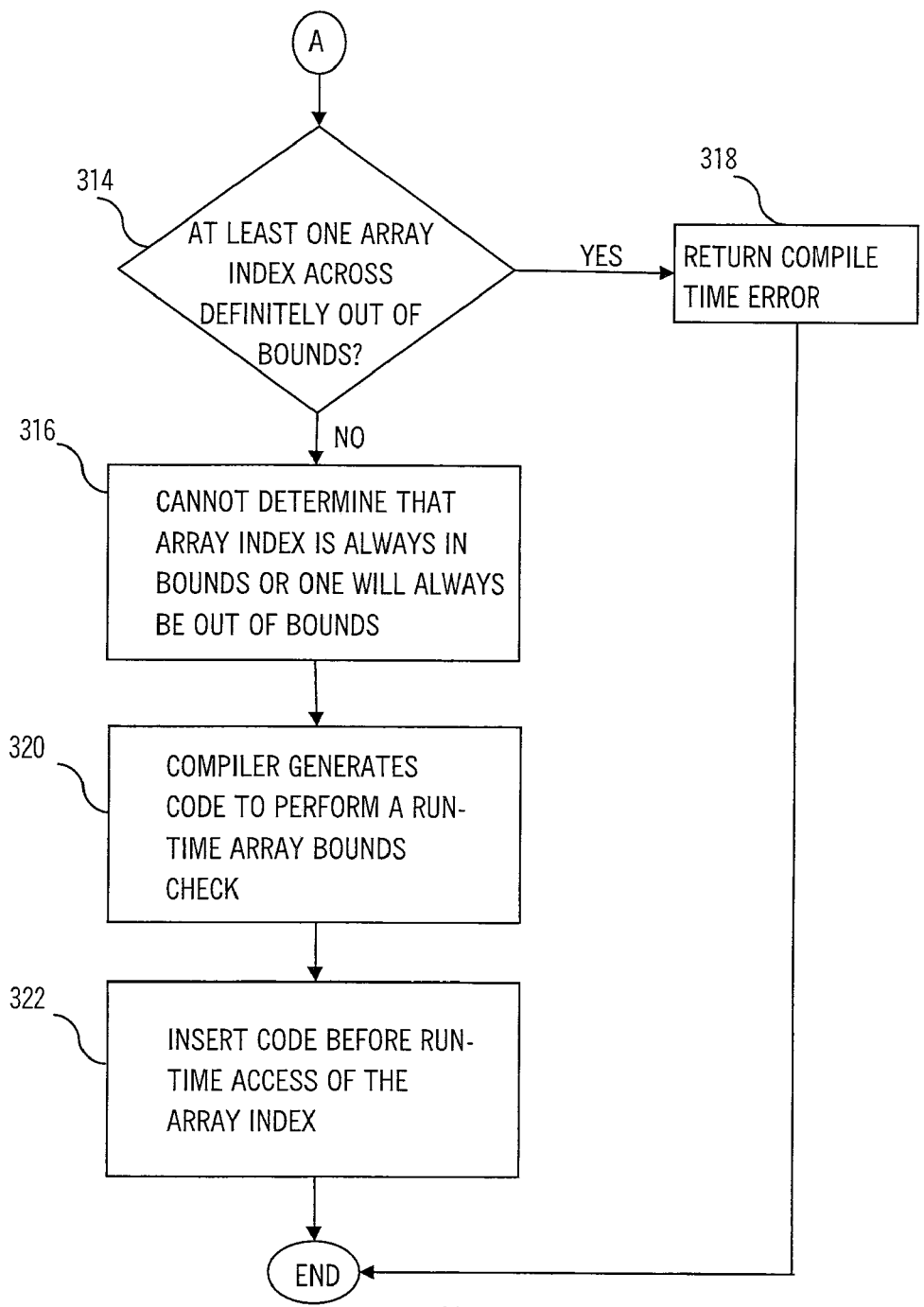

FIGS. 3a and 3b depict steps in an exemplary method for analyzing array references at compile-time and inserting run-time bounds checking code 204. Referring now to FIG. 3a, when a compiler 114 parses source code 130 with parser 120 to generate object code 132, the compiler may analyze array allocation and references to determine if any are out of bounds. If the compiler 114 detects an array allocation, it may check to see if the array 202 is dynamically allocated at run-time (step 301). If the array 202 is dynamically allocated at run-time (step 302), then the compiler 114 may check to see if there is a reference to the array index in the array 202 in the source code 130 (step 303). If there was no dynamically allocated array 202 then no run-time check is needed (step 312). If there is a reference to an array index in a dynamically allocated array, then the compiler 114 may check whether the access statement is dominated by the allocation statement and whether the access statement is guaranteed to be live (step 305). If both are true, (step 306), the bounds checker 122 of the compiler 114 checks the bounds of the array index (step 308). If the array index is always in bounds of the array (step 310), then no run-time check is needed (step 312).

Referring now to FIG. 3b, if at least one array index access is definitely out of bounds (step 314), then the compiler 114 may return a compile-time error (step 318). However, if the compiler 114 cannot determine that the array index is always in bounds or one access will always be out of bounds (step 316), then the compiler's code generator 124 and instrumentation module 126 generate run-time bounds check code 204 to perform a run-time bounds check (step 320). The compiler's instrumentation module 126 may then insert the code 204 before run-time access of the array index (step 322). In one implementation, this code 204 is inserted just before the array index access.

Figure 4:
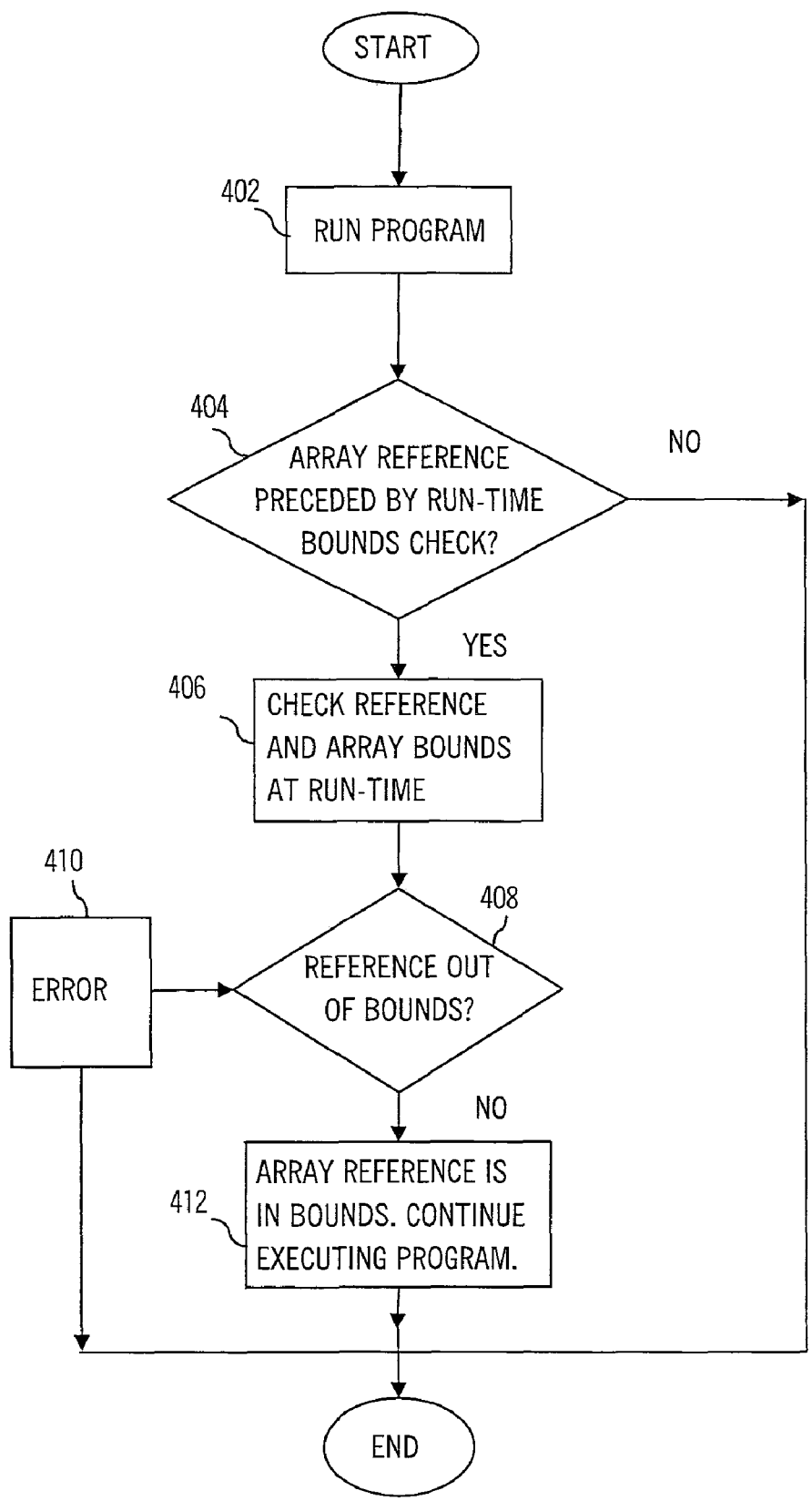
FIG. 4 shows the steps in an exemplary method for running a program with inserted run-time array checking code in accordance with methods and systems consistent with the present invention.

FIG. 4 shows the steps in an exemplary method for running a program with inserted run-time array checking code 204 in accordance with methods and systems consistent with the present invention. First, a program is run by executing, for example, object code 132 (step 402).

During the running of the program, if a run-time array bounds check code 204 preceding an array reference is encountered (step 404), then the reference to the array 202 is checked against the bounds of the array (step 406). In one implementation, this check may be done against both bounds of the array 202, and in another implementation, the check may be done against one of the bounds of the array. If the reference to the array 202 is determined to be out of bounds (step 408), then an error may be returned (step 410). If the array reference is determined to not be out of bounds (step 408), then the array reference is in bounds, and the program can continue executing (step 412).

The foregoing description of an implementation of the invention has been presented for purposes of illustration and description. It is not exhaustive and does not limit the invention to the precise form disclosed. Modifications and variations are possible in light of the above teachings or may be acquired from practice. For example, the described implementation includes software but the present invention may be implemented as a combination of hardware and software or in hardware alone. Note also that the implementation may vary between systems. The invention may be implemented with both object-oriented and non-object-oriented programming systems.

What is claimed is:

1. A method in a data processing system for use in performing bound checking in source code, the source code having a pointer referenced as an array, the method comprising:

parsing, by a compiler, the source code to detect array allocation statements and array accesses to the array allocation statements;

determining, when an array allocation statement is detected by the compiler during the parsing step, whether the array is dynamically allocated at run-time or statically defined based on the array allocation instruction;

if the array is statically defined, determining, by the compiler, whether any array access is outside of determined bounds of the array and issuing an error message when an array access is outside of the determined bounds without performing a run-time bounds check operation; and if the array is dynamically, allocated, performing, by the compiler, a bounds check operation on array accesses within the source code, wherein:

if the compiler determines while performing the bounds check operation that an array access is out-of-bounds of the array, then the compiler issues an error message for the array access; and if the compiler is unable to determine while performing the bounds check operation that an array access is out-of-bounds of the array, then the compiler performs a run-time bounds check operation before the array access is executed.

2. The method of claim 1, further comprising generating code to perform the run-time bounds check operation during run-time.

3. The method of claim 1, further comprising determining that no run-time bounds check operation is needed if an array access is always in bounds.

4. The method of claim 1, further comprising determining if an array access is dominated by an array allocation statement.

5. The method of claim 4, further comprising determining whether a pointer assignment associated with an array access is always live.

6. The method of claim 1, wherein at least one array access is in the C programming language.

7. The method of claim 1, wherein at least one array access is in the C++ programming language.

8. A computer-readable storage medium containing instructions in a data processing system to perform a method for use in performing bound checking in source code, the source code having a pointer referenced as an array, the method comprising:

parsing, by a compiler, the source code to detect array allocation statements and array accesses to the array allocation statements;

determining, when an array allocation statement is detected by the compiler during the parsing step, whether the array is dynamically allocated at run-time or statically defined based on the array allocation instruction;

if the array is statically defined, determining, by the compiler, whether any array access is outside of determined bounds of the array and issuing an error message when an array access is outside of the determined bounds without performing a run-time bounds check operation; and if the array is dynamically allocated, performing, by the compiler, a bounds check operation on array accesses within the source code, wherein:

if the compiler determines while performing the bounds check operation that an array access is out-of-bounds of the array, then the compiler issues an error message for the array access; and if the compiler is unable to determine while performing the bounds check operation that an array access is out-of-bounds of the array, then the compiler performs a run-time bounds check operation before the array access is executed.

9. The computer-readable storage medium of claim 8, wherein the method further comprises generating code to perform the run-time bounds check operation during run-time.

10. The computer-readable storage medium of claim 8, wherein the method further comprises determining that no run-time bounds check operation is needed if an array access is always in bounds.

11. The computer-readable storage medium of claim 8, wherein the method further comprises determining if an array access is dominated by an array allocation statement.

12. The computer-readable storage medium of claim 8, wherein the method further comprises determining whether a pointer assignment associated with an array access is always live.

13. The computer-readable storage medium of claim 8, wherein at least one array access is in the C programming language.

14. The computer-readable storage medium of claim 8, wherein at least one array access is in the C++ programming language.

15. A data processing system having source code with a pointer referenced as an array, comprising:

a memory having a program that comprises the steps of:

parsing, by a compiler, the source code to detect array allocation statements and array accesses to the array allocation statements;

determining, when an array allocation statement is detected by the compiler during the parsing step, whether the array is dynamically allocated at run-time or statically defined based on the array allocation instruction;

if the array is statically defined, determining, by the compiler, whether any array access is outside of determined bounds of the array and issuing an error message when an array access is outside of the determined bounds without performing a run-time bounds check operation; and if the array is dynamically allocated, performing, by the compiler, a bounds check operation on array accesses within the source code, wherein:

if the compiler determines while performing the bounds check operation that an array access is out-of-bounds of the array, then the compiler issues an error message for the array access; and if the compiler is unable to determine while performing the bounds check operation that an array access is out-of-bounds of the array, then the compiler performs a run-time bounds check operation before the array access is executed.

16. The data processing system of claim 15, wherein the program further generates code to perform the run-time bounds check operation, during run-time.

17. The data processing system of claim 15, wherein the program further determines that no run-time bounds check is needed if an array access is always in bounds.

18. The data processing system of claim 15, wherein the program further determines if an array access is dominated by an array allocation statement.

19. The data processing system of claim 15, wherein the program further determines whether a pointer assignment associated with an array access is always live.

20. The data processing system of claim 15, wherein at least one array access is in the C programming language.

21. The data processing system of claim 15, wherein at least one array access is in the C++ programming language.

22. A data processing system having source code with a pointer referenced as an array, comprising:
   means for parsing the source code to detect array allocation statements and array accesses to the array allocation statements;
   means for determining, when an array allocation statement is detected, whether the array is dynamically allocated at run-time or statically defined based on the array allocation instruction;
   if the array is statically defined, means for determining whether any array access is outside of determined bounds of the array and issuing an error message when an array access is outside of the determined bounds without performing a run-time bounds check operation; and
   if the array is dynamically allocated, means for performing a bounds check operation on array accesses within the source code, wherein:
      if the means for performing a bounds check operation determines that an array access is out-of-bounds of the array, then the means for performing a bounds check operation issues an error message for the array access; and
      if the means for performing a bounds check operation is unable to determine that an array access is out-of-bounds of the array, then the means for performing a bounds check operation performs a run-time bounds check operation before the array access is executed.

23. The method of claim 1, further comprising inserting code to perform the run-time bounds check operation.

24. The method of claim 23, further comprising:
   running a program with the inserted code;
   running the inserted code at run-time to check the array access; and
   determining that the array access would be out-of-bounds before executing the array access.

25. The method of claim 23, further comprising:
   running a program with the inserted code;
   running the inserted code at run-time to check the array access; and
   determining that the array access would be in-bounds before executing the array access.

26. The computer-readable storage medium of claim 8, wherein the method further comprises inserting code to perform the run-time bounds check operation.

27. The computer-readable storage medium of claim 26, wherein the method further comprises:
   running a program with the inserted code;
   running the inserted code at run-time to check the array access; and
   determining that the array access would be out-of-bounds before executing the array access.

28. The computer-readable storage medium of claim 26, wherein the method further comprises:
   running a program with the inserted code;
   running the inserted code at run-time to check the array access; and
   determining that the array access would be in-bounds before executing the array access.

29. The data processing system of claim 15, wherein the program further inserts code to perform the run-time bounds check operation.

30. The data processing system of claim 29, wherein the program further runs a second program with the inserted code, runs the inserted code at run-time to check the array access, and determines that the array access would be out-of-bounds before executing the array access.

31. The data processing system of claim 29, wherein the program further runs a second program with the inserted code, runs the inserted code at run-time to check the array access, and determines that the array access would be in-bounds before executing the array access.

32. The data processing system of claim 22, further comprising means for inserting code to perform the run-time bounds check operation.

33. The data processing system of claim 32 further comprising:
   means for running a program with the inserted code;
   means for running the inserted code at run-time to check the array access; and
   means for determining that the array access would be out-of-bounds before executing the array access.

34. The data processing system of claim 32, further comprising:
   means for running a program with the inserted code;
   means for running the inserted code at run-time to check the array access; and
   means for determining that the array access would be in-bounds before executing the array access.

* * * * *